United States Patent Office 2,907,782
Patented Oct. 6, 1959

2,907,782

ORGANOSILICON UREAS AND PROCESSES FOR PRODUCING THE SAME

Ronald M. Pike, Grand Island, N.Y., assignor to Union Carbide Corporation, a corporation of New York No Drawing. Application October 12, 1956
Serial No. 615,497

15 Claims. (Cl. 260—448.2)

This invention relates to organosilicon compounds and to processes for their production. More particularly, this invention is concerned with organosilicon compounds containing, among other functional groups, the ureylene group (—HNCONH—) which is linked to a silicon atom through a polymethylene chain of at least 3 carbon atoms, as new compositions of matter. This invention is also concerned with processes for producing said organosilicon compounds and to uses thereof.

The present invention is based upon my discovery that organosilicon compounds containing an ureylene group (—HNCONH—) attached to a silicon atom through a polymethylene linkage can be produced by reacting an organosilicon compound with an organo isocyanate, as represented by the following equation:

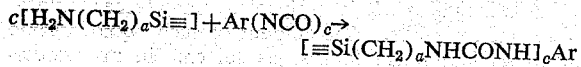

wherein $a$ is an integer having a value of at least 3; $c$ is an integer having a value of at least 1 and preferably from 1 to 3; and Ar represents a hydrocarbon radical or substituted hydrocarbon radical, and wherein the isocyanato radicals (—NCO) are attached to different carbon atoms in the same molecule.

According to my studies the reaction is a general one and is applicable to all organosilicon compounds which contain the aminoalkylsilyl grouping depicted above. Suitable for use in my process are the aminoalkylalkoxysilanes and the aminoalkylpolysiloxanes including copolymeric materials which contain both aminoalkylsiloxane and hydrocarbon siloxane units.

Typical of the aminoalkylalkoxysilanes suitable for use as my organosilicon starting materials are those compounds represented by the structural formula:

$$\text{H}_2\text{N(CH}_2)_a\text{SiX}_{(3-b)}^{R'_b}$$

wherein R' represents an alkyl group such as methyl, ethyl, propyl, butyl and the like, or an aryl group such as phenyl, naphthyl, tolyl and the like, or an aralkyl group such as benzyl and the like, X represents an alkoxy group such as methoxy, ethoxy, propoxy and the like, $a$ is an integer having a value of at least 3 and preferably a value of from 3 to 4 and $b$ is an integer having a value of from 0 to 2 and preferably a value of from 0 to 1. Illustrative of such aminoalkylalkoxysilanes are gamma - aminopropyltriethoxysilane, gamma - aminopropylmethyldiethoxysilane, gamma - aminopropylethyldiethoxysilane, gamma-aminopropylphenyldiethoxysilane, delta-aminobutyltriethoxysilane, delta - aminobutylmethyldiethoxysilane, delta - aminobutylethyldiethoxysilane, delta-aminobutylphenyldiethoxysilane and the like.

Typical of the aminoalkylpolysiloxanes suitable for use as our organosilicon starting materials are those polysiloxanes which contain the structural unit:

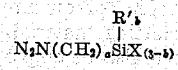

wherein R', $a$ and $b$ have the same values described above. Such polysiloxanes are prepared by the hydrolysis and condensation of those aminoalkylalkoxysilanes described above or by the cohydrolysis and co-condensation of such aminoalkylalkoxysilanes with other hydrolyzable silanes and can include: aminoalkylpolysiloxanes of the trifunctional variety (i.e. where $b=0$), aminoalkylalkyl- and aminoalkylarylpolysiloxanes of the difunctional variety which include cyclic or linear polysiloxanes (i.e. where $b=1$) and linear aminoalkyldialkyl-, aminoalkyldiaryl- and aminoalkylalkylaryldisiloxanes of the monofunctional variety (i.e. where $b=2$) as well as mixtures of compounds produced by the cohydrolysis of difunctional and trifunctional aminoalkylsilanes.

Suitable starting aminoalkylpolysiloxanes of the trifunctional variety can be more specifically depicted as containing the structural unit:

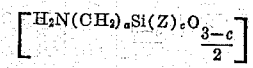

wherein $a$ has the value previously described, Z represents an hydroxyl or alkoxy group and $c$ has an average value of from 0 to 1, and can be as high as 2; preferably $c$ has a value from 0.1 to 1. Aminoalkylpolysiloxanes of this variety which are essentially free of silicon-bonded alkoxy or hydroxyl groups (i.e. where $c=0$) can be prepared by the complete hydrolysis and the complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzates so formed to produce the desired polymer.

Suitable starting aminoalkylpolysiloxanes of the difunctional variety, which include cyclic and linear polysiloxanes, can be more specifically defined by the structural formula:

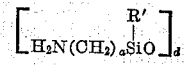

wherein R' and $a$ have the values previously described and $d$ is an integer having a value of at least 3 and can be as high as 7 for the cyclic aminoalkylsiloxanes and higher for the linear aminoalkylpolysiloxanes. Such cyclic and linear aminoalkylpolysiloxanes can be prepared by the hydrolysis and condensation of aminoalkylalkyl- or aminoalkylaryldiethoxysilanes. In carrying out the hydrolysis and condensation procedures, there is produced a product comprising a mixture of cyclic and linear polysiloxanes from which the desired polysiloxane can be recovered. Illustrative of the cyclic aminoalkylsiloxanes suitable for use as the organosilicon starting material in my process are the cyclic tetramer of gamma-aminopropylmethylsiloxane, the cyclic tetramer of delta-aminobutylphenylsiloxane and the like. Illustrative of suitable linear aminoalkylpolysiloxanes are gamma-aminopropylmethylpolysiloxane, gamma - aminopropylethylpolysiloxane, delta - aminobutylmethylpolysiloxane and the like.

Included among the useful starting linear aminoalkylpolysiloxanes are the alkyl, alkoxy and hydroxyl endblocked polysiloxanes which contain from 1 to 3 of such groups bonded to the terminal silicon atoms of the molecules comprising the polymeric chains. Thus I can also employ as my starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkyl- and aminoalkylarylpolysiloxanes useful in my process can be prepared by the equilibration of cyclic aminoalkylsiloxanes with silicon compounds containing predominantly silicon-bonded alkoxy groups, or by the co-hydrolysis and condensation of trialkylalkoxysilanes with aminoalkylalkyl- or aminoalkylaryldiethoxysilanes. Hydroxy end-blocked linear polysiloxanes can be prepared by heating linear or cyclic aminoalkylpolysiloxanes with water.

The copolymeric aminoalkylpolysiloxanes which can be employed as starting materials can be depicted as containing both of the structural units:

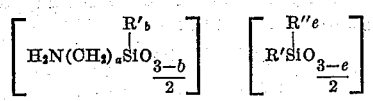

wherein R', a and b have the values described above, R'' represents an alkyl or aryl group and e is an integer having a value of from 0 to 2. My copolymers can be mixtures of trifunctional aminoalkylsiloxanes units (where b=0) with trifunctional alkyl-, aryl- or mixed alkyl- and arylsiloxane units (where e=0) or with difunctional alkyl, aryl- or mixed alkyl- and arylsiloxanes units (where e=1). They can also include mixtures of difunctional aminoalkylsiloxane units (where b=1) with trifunctional alkyl-, aryl- or mixed alkyl- and arylsiloxane units (where e=0) or with difunctional alkyl-, aryl- or mixed alkyl- and arylsiloxane units (where e=1).

Those copolymers which contain trifunctional aminoalkylsiloxane units and other siloxane units are preferably prepared by the co-hydrolysis and co-condensation of the corresponding alkoxysilane starting materials. Such copolymers can contain silicon-bonded hydroxyl or alkoxy groups or they can comprise essentially completely condensed materials. The linear and copolymeric siloxanes are preferably prepared by the separate hydrolysis and condensation of an aminoalkylalkyl- or aminoalkylaryldialkoxysilane and the dialkyl- or diaryldialkoxysilane to cyclic aminoalkylsiloxanes and cyclic dialkyl- or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups. The equilibration will also produce some copolymeric cyclic siloxanes.

The aminoalkylalkoxysilanes and aminoalkylpolysiloxanes as well as copolymers containing aminoalkylsiloxanes and hydrocarbon siloxane units are all disclosed and claimed as new compositions of matter in copending U.S. applications Ser. Nos. 615,466, 615,481, 615,483, now abandoned, and 615,507, filed concurrently herewith. Processes for producing such compounds are also disclosed and claimed in said copending applications.

The organo isocyanates that can be used in the process of this invention for the production of the unique urylene-containing silicon compounds may be represented by the formula:

$$Ar(NCO)_c$$

wherein Ar represents a hydrocarbon radical, either substituted or unsubstituted and c is an integer having the value of at least 1 and preferably from 1 to about 3.

The hydrocarbon radical, Ar, may be an aryl radical such as phenyl, naphthyl, tolyl, or biphenyl; or an arylene radical such as phenylene, naphthylene, tolylene or biphenylene; and said hydrocarbon radical may be substituted, in addition to the isocyanato group (—NCO), with one or more substituents such as alkyl radicals, alkoxy radicals, aryl radicals, nitroradicals, halogen atoms, aralkyl radicals, alkaryl radicals, etc., which substituents do not affect the reaction of this invention and do not interfere with the formation of the products of this invention; or Ar may be an alkyl or alkylene radical containing from 1 to about 15 carbon atoms and preferably from about 4 to about 10 carbon atoms.

Illustrative of the organo isocyanates which may be used in this invention are phenylisocyanate, tolylisocyanate, diphenylisocyanate, 2-naphthylisocyanate, 1,5-naphthyldiisocyanate, 2,4-tolylenediisocyanate, 1,4-phenylenediisocyanate, hexamethylenediisocyanate, methylene-bis-(4-phenylisocyanate), triphenylmethane triisocyanate, 4,4'-biphenylenediisocyanate, 3,3'-dimethoxy-4,4'-biphenylenediisocyanate, 2,4,6-tolyltriisocyanate, n-butylisocyanate, and the like.

The reaction between the organic isocyanate and organosilicon compound containing the aminoalkylsilyl grouping is exothermic in nature and can be carried out by forming a mixture of the reactants. I prefer to conduct the reaction in the presence of a liquid organic compound in which my starting materials are soluble and which is non-reactive with the isocyanato group of the organic isocyanate or the amino group of my organosilicon reactant or other substituents thereon. Preferably, the organic solvent is anhydrous. Among the liquid organic compounds suitable for use in my process are: the aromatic hydrocarbons such as benzene, toluene, and the like, the aliphatic ethers such as diethyl ether, petroleum ether, and the like, as well as other organic compounds including ethylene glycol dimethyl ether, chloroform, and the like. The amount of such liquid organic compounds suitable for use as solvents in my process is not narrowly critical and can vary over a wide range. I prefer to employ the solvent in amounts of at least about equal in volume to the combined liquid or dissolved volumes of my starting materials.

The amount of organic isocyanate and the organosilicon compound employed in the process of this invention is not narrowly critical and can vary over a wide range. While it is known that isocyanates will also react with hydroxyl groups attached to silicon atoms the reaction of isocyanates with amino groups is a preferential reaction and occurs at such a rate that the presence of a small amount of hydroxyl groups will not interfere with my reaction. I prefer to employ the starting materials in chemically stoichiometric amounts. That is, for each isocyanate group present in my organic isocyanate I prefer to have present in the reaction mixture one mole equivalent of an aminoalkylsilyl group. Amounts of either starting material smaller or greater than that preferred can also be employed when there are no hydroxyl groups present in the aminoalkylsilicon compound or when small amounts of hydroxyl groups are present.

In carrying out my process, the reaction between the organosilicon compound containing the aminoalkylsilyl grouping and the organo isocyanate containing the isocyanato grouping is preferably conducted at temperatures below the boiling point of the liquid organic solvent selected for use in the reaction, although higher temperatures can be employed when the reaction is conducted in closed systems. It has been found convenient to conduct the reaction at temperatures of from about 20° C. to about 125° C. It has also been found preferable to carry out the reaction in a dry inert atmosphere to prevent hydrolysis of the isocyanato group or groups as well as of the aminoalkylalkoxysilanes when such are employed as one of the starting materials.

One method of conducting the reaction between my starting materials is to first add a solution of the organo isocyanate to a solution of the aminoalkylsilicon compound and then complete the reaction by heating at the reflux temperature of the reaction mixture. The urylene-containing organosilicon compounds of my invention can then be recovered from the reaction mixture by known separation techniques.

The monomeric organosilicon compounds of this invention which contain an ureylene group bonded to the silicon atom thereof through a polymethylene linkage are 1,3-disubstituted ureas and can be represented by the following formula:

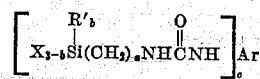

wherein X, R', Ar, $a$, $b$ and $c$ have the same values described above.

The polymeric silicon-containing disubstituted ureas produced in this invention are the siloxane polymers containing units represented by the formula:

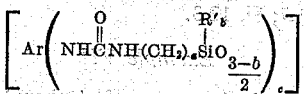

and siloxane copolymers containing units represented by the following formulae:

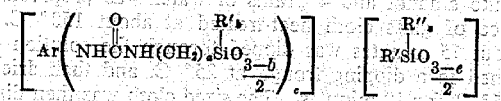

wherein Ar, R' and R'', $a$, $b$, $c$ and $e$ have the same meanings as described above; and wherein the polymeric siloxane compounds may contain alkoxy or hydroxyl groups bonded to some of the silicon atoms.

The novel monomeric and polymeric compounds produced by the process of the present invention are useful as intermediates in the production of ureylene-containing silicon compounds and other organic derivatives thereof. The liquid monomers of this invention may be used as sizes for fibrous materials, and as intermediates for the production of siloxane polymers and copolymers. The siloxane polymers and copolymers produced can be oils, which are useful themselves as lubricants; or they can be employed as modifying ingredients for known silicone lubricating oils and to modify silicon elastomers. The siloxane polymers and copolymers can also be produced as semi-solids useful in themselves as adhesives and as grease-modifiers.

The trifunctional siloxane polymers and copolymers produced are cross-linked in nature and set to solid materials useful as protective coatings. Also, the solid polymers and copolymers of this invention can be used as grease thickeners and as additives or modifying ingredients for the known thermosetting polysiloxanes.

The following examples further serve to illustrate this invention.

*Example I*

Under a protective nitrogen atmosphere added a solution of 17.9 grams of phenylisocyanate in 100 ml. anhydrous diethyl ether to a 250 ml. Pyrex flask equipped with a stirrer, condenser, dropping funnel and thermometer. There was added 22.1 grams of gamma-aminopropyltriethoxysilane to the flask in a dropwise manner, at such a rate that a slight reflux was maintained by the exothermic heat of reaction. After the addition was complete the reaction mixture was heated at reflux (about 35° C.) for an additional hour. The ether was distilled at a reduced pressure and excess phenylisocyanate was removed by distillation to a pot temperature of 150° C. at a pressure of 1 mm. of mercury. The 1-phenyl-3-(gamma-triethoxysilylpropyl)-urea produced was a thick brown oil and weighed 35.1 grams. A purified sample was prepared and analyzed. Calculated for $C_{16}H_{28}O_4N_2Si$: 

N, 8.2. Found: N, 8.4. Infrared spectrum confirmed the presence of —NH—, =CO, —C=C— of ring phenyl, —OC$_2$H$_5$, ≡SiOC$_2$H$_5$ and ≡SiCH$_2$— groups in the molecule.

*Example II*

A 250 ml. Pyrex flask was equipped as described in Example I and charged, under nitrogen, with a solution of 21.3 grams of a trimethylsiloxy end-blocked dimethylsilicone oil having an average molecular weight of about 5000 and containing 11 weight percent of delta-aminobutylmethylsiloxy units dissolved in 75 ml. of anhydrous diethyl ether. A solution of 3.6 grams of phenylisocyanate dissolved in 25 ml. of anhydrous diethyl ether was added to the solution in the flask in a dropwise manner at such a rate that a slight reflux was maintained. The resulting mixture was stirred and heated at reflux, about 35° C., for an additional 3 hours. The ether was distilled at atmospheric pressure and excess phenylisocyanate was removed by distillation to a pot temperature of 130° C. at a pressure of about 2 mm. of mercury. There was obtained 23 grams of a viscous, colorless ureylene-containing siloxane oil, having the average formula:

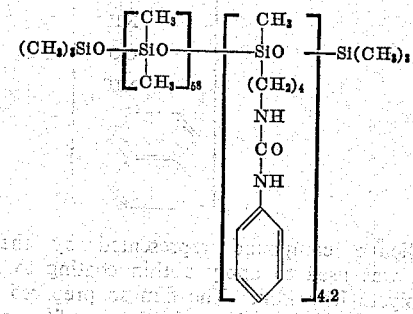

The same experiment was repeated using a trimethylsiloxy end-blocked dimethylsilicone oil having an average molecular weight of about 5000 and containing 10 weight percent of gamma-aminopropylmethylsiloxy units. A colorless viscous ureylene-containing oil was obtained, which can be represented by the average formula:

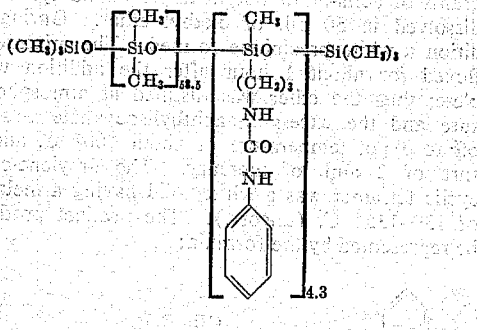

*Example III*

By means of the procedure described in Example II a solution of 11.9 grams of phenylisocyanate in 50 ml. of ether was added to a solution consisting of 13.1 grams of delta-aminobutylmethylsiloxane cyclic tetramer in 50 ml. of anhydrous diethyl ether and the reaction mixture was refluxed for 2 hours. After distilling the solvent and excess phenylisocyanate the ureylene-containing cyclic tetramer was obtained as a fluffy white powder having a melting point of 78–79° C. The cyclic tetramer can be represented by the formula:

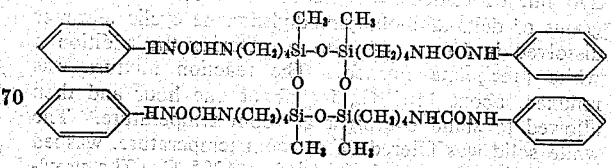

*Example IV*

By means of the procedure described in Example II a solution of 4.2 grams of 2-naphthylisocyanate in 50 ml. of anhydrous diethyl ether was added to a solution of 21.3 grams of a trimethylsiloxy end-blocked dimethylsilicone oil, having an average molecular weight of about 20,000 and containing 10 weight percent gamma-aminopropylmethylsiloxy units, dissolved in 50 ml. of anhydrous diethyl ether. The mixture was refluxed for one hour after addition was complete and allowed to stand overnight at room temperature. The ether was distilled at atmospheric pressure and excess 2-naphthylisocyanate was removed by distillation to a pot temperature of 100° C. at a pressure of about 2 mm. of mercury. The ureylene-containing silicone compound produced was a white gummy semi-solid, and can be represented by the formula:

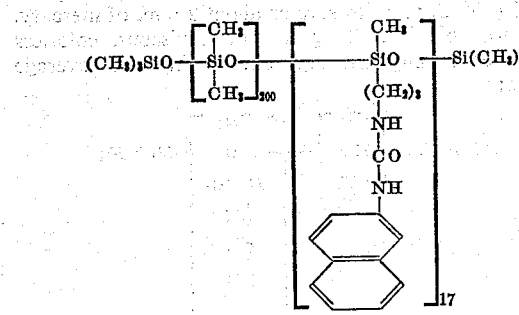

The silicone compound represented by the above formula was used to apply a thin coating to a 4 mil thick polyethylene film. The film so prepared had adhesive properties and the polyethylene film could be made to adhere to glass by pressing with the fingers.

Example V

By means of the procedure described in Example II a solution of 20.3 grams of 2-naphthylisocyanate in 50 ml. of diethyl ether was added to a solution of 13.1 grams of delta-aminobutylmethylsiloxane cyclic tetramer dissolved in 50 ml. of diethyl ether. During the addition a white precipitate formed. The mixture was refluxed for about 1 hour after the addition was complete; then the ether was distilled at atmospheric pressure and the excess 2-naphthylisocyanate was distilled off to a pot temperature of about 100° C. and a pressure of 2 mm. of mercury. The ureylene-containing cyclic tetramer was a white solid having a melting point of 130–135° C. (uncorr.). The product produced can be represented by the formula:

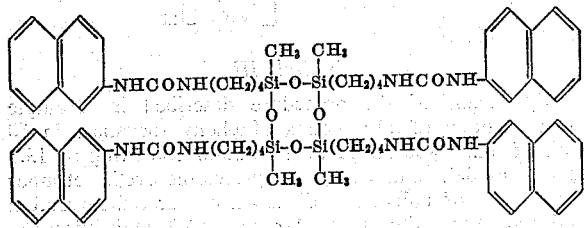

Example VI

By means of the procedure described in Example II a solution of 10.5 grams of 1,5-naphthyldiisocyanate in 250 ml. of toluene was added to a solution of 13.1 grams of delta-aminobutylmethylsiloxane cyclic tetramer dissolved in 50 ml. of toluene. During the addition a white precipitate formed. The reaction mixture was refluxed, about 110° C., for about one hour and then allowed to stand overnight at room temperature. The white solid was filtered off at room temperature, washed with fresh toluene and air dried at 120° C. The ureylene-containing cyclic tetramer weighed 22.2 grams and was a white solid. Upon heating, it discolored slightly at about 120° C., but did not melt at temperatures up to 300° C. The product can be represented as having tetramer cyclic rings interconnected by means of naphthyldiureylene groups as illustrated below, wherein a single unit of only two cyclic tetramers is portrayed:

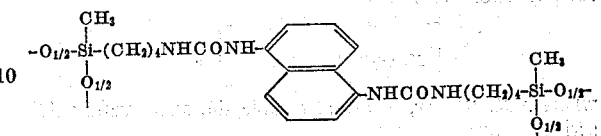

Calculated for $C_{22}H_{32}O_4N_4Si_2$: N, 11.9; Si, 11.9. Found: N, 11.7; Si, 12.3.

Example VII

A solution of 4 grams of 1-phenyl-3-(gamma-triethoxysilylpropyl)-urea dissolved in 392 grams of absolute ethanol and 4 grams of water was prepared. A piece of glass cloth heat-treated at about 150° C. for about 15 minutes was dipped through the solution contained in a dipping trough at 25° C. and then dried at 125° C. for 10 minutes. The sized cloth was then dipped into the resins indicated below and dried at about 135° C. Laminated structures were prepared by subjecting about 13 layers of sized and resin impregnated glass cloth pieces, about 6 inches square, to a pressure of from about 250 to about 1000 p.s.i. at about 300° F. in a mold for about 10 to 30 minutes. The flexural strengths of the laminates were then determined by means of the testing procedure described in A.S.T.M. D–650–42T. The results are listed below:

| Resin Employed | Flexural Strength, p.s.i. | |
|---|---|---|
| | Dry | Wet |
| Melmac 405 | 67,500 | 64,000 |
| Epon 828 | 85,000 | 78,500 |
| Narmco 506 | 48,500 | 50,000 |

Melmac 405 is a trademark registered by American Cyanamid Company, Inc., for a solid thermosetting melamine-formaldehyde resin produced by the interreaction of formaldehyde, said resin containing residual methylol groups.

Epon 828 is a trademark registered by Shell Chemical Company for a liquid thermosetting epoxy resin having a melting point of about 8–12° C. and an epoxy equivalent of 190 to 210 produced by the interaction of a polyhydric phenol with epichlorohydrin.

Narmco 506 is a trademark registered by Narmco Company for a thermosetting phenolic resin.

Example VIII

The ureylene-containing silicon compound produced in Example VI was used as a grease thickener for silicone greases. Ten grams of the product from Example VI was compounded for about ¾ hour at about 30° C. on a rubber mill with 50 grams of a 350 cs. dimethylsilicone oil having an average molecular weight of about 15,400. Added an additional 25 grams of dimethylsilicone oil and compounded the mixture for another 1 hour. From this mixture took 39.5 grams and added an additional 10 grams of the ureylene-containing silicon compound of Example VI. This was compounded for another 1½ hours at 30° C. to produce the final grease, which was light tan in color.

What is claimed is:

1. Process for the production of ureylene-containing silicon compounds selected from the group consisting of silanes represented by the general formula:

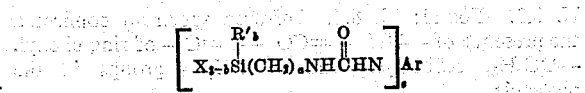

and siloxane polymers and copolymers containing the unit represented by the general formula:

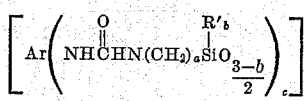

wherein R' represents a member selected from the group consisting of aryl radicals, alkyl radicals and aralkyl radicals; X represents an alkoxy radical; (a) is an integer having a value of at least 3 wherein the $(CH_2)_a$ group is a lower alkylene group; b is an integer having a value of from 0 to 2; c is an integer having a value of from 1 to about 3; and Ar represents a member selected from the group consisting of aryl radicals, alkyl radicals, arylene radicals and alkylene radicals, which comprises reacting at a temperature up to about the reflux temperature of the reaction mixture an aminoalkyl silicon compound selected from the group consisting of silanes represented by the general formula:

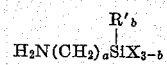

and siloxanes containing the unit represented by the general formula:

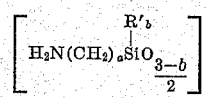

wherein R', X, a and b have the same meanings defined above, with an organo isocyanate selected from the group represented by the general formula:

$$Ar(NCO)_c$$

wherein Ar and c have the same meanings defined above.

2. The process as claimed in claim 1, wherein the isocyanate is a member selected from the group consisting of aryl monoisocyanates.

3. The process as claimed in claim 1, wherein the isocyanate is a member selected from the group consisting of aryl polyisocyanates containing up to about 3 isocyanato groups.

4. The process as claimed in claim 1, wherein the isocyanate is a member selected from the group consisting of alkyl monoisocyanates.

5. The process as claimed in claim 1, wherein the isocyanate is a member selected from the group consisting of alkyl polyisocyanates containing up to about 3 isocyanate groups.

6. The process as claimed in claim 1, wherein the aminoalkylsilane is gamma-aminopropyltriethoxysilane, the aryl isocyanate is phenylisocyanate, and the ureylene-containing silane produced is 1-phenyl-3-(gamma-triethoxysilylpropyl)-urea.

7. The process as claimed in claim 1, wherein the aminoalkylpolysiloxane is a dimethylsilicone oil having an average molecular weight of about 5000 and containing about 11 weight-percent of delta-aminobutylmethylsiloxy units, the isocyanate is phenylisocyanate, and the ureylene-containing polysiloxane copolymer produced contains the units represented by the average formula:

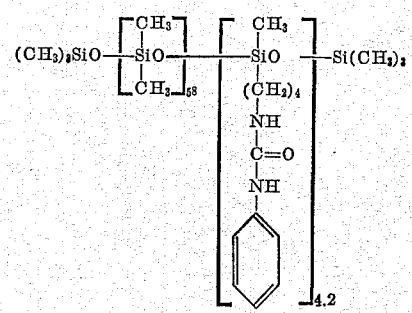

8. The process as claimed in claim 1, wherein the aminoalkylpolysiloxane is delta-aminobutylmethyl-siloxane cyclic tetramer, the aryl isocyanate is 2-naphthylisocyanate, and the ureylene-containing silicon compound produced may be represented by the average formula:

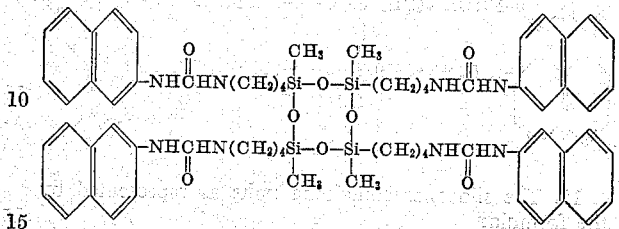

9. The process as claimed in claim 1, wherein the aminoalkylpolysiloxane is delta-aminobutylmethylsiloxane cyclic tetramer, the aryl isocyanate is 1,5-naphthyldiisocyanate, and the ureylene-containing silicon compound contains napythyldiureylene units as represented by the formula:

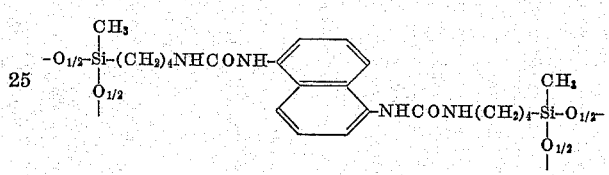

10. The process as claimed in claim 1, wherein an aminoalkylalkoxysilane is reacted with an organo isocyanate for the production of an ureylene-containing silane, and further comprising the steps of hydrolyzing and condensing said ureylene-containing silane to produce a corresponding ureylene-containing polysiloxane.

11. Ureylene-containing silicon compounds selected from the group consisting of silanes represented by the general formula:

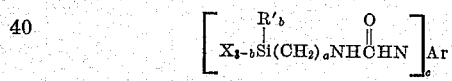

and siloxane polymers and copolymers containing the unit represented by the general formula:

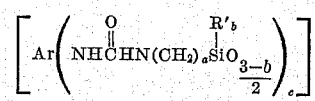

wherein R' represents a member selected from the group consisting of aryl radicals, alkyl radicals and aralkyl radicals; X represents an alkoxy radical; a is an integer having a value of at least 3 wherein the $(CH_2)_a$ group is a lower alkylene group; b is an integer having a value of from 0 to 2; c is an integer having a value of from 1 to about 3; and Ar represents a member selected from the group consisting of aryl radicals, alkyl radicals, arylene radicals and alkylene radicals.

12. 1 - phenyl - 3 - (gamma-triethoxysilylpropyl)-urea.

13. The polysiloxane containing the units represented by the following formula:

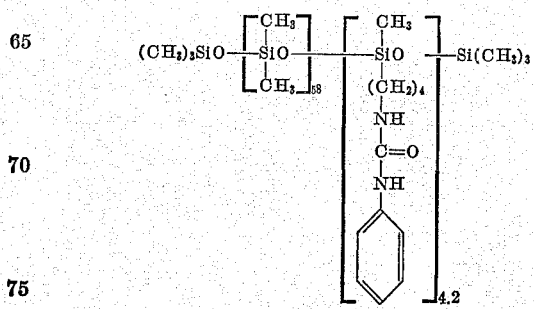

14. The cyclic siloxane represented by the formula:
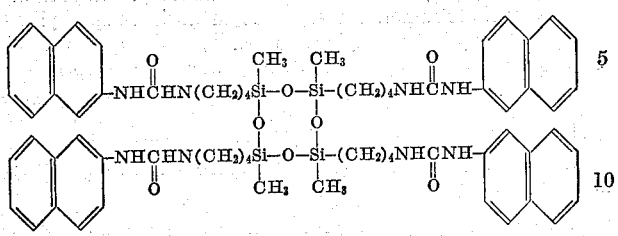
15. The siloxanes containing units as represented by the formula:
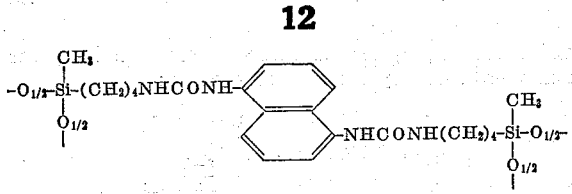
References Cited in the file of this patent
UNITED STATES PATENTS
| | | |
|---|---|---|
| 2,511,310 | Upson | June 13, 1950 |
| 2,655,447 | Todd | Oct. 13, 1953 |
| 2,729,677 | Gilbert et al. | Jan. 3, 1956 |
| 2,754,311 | Elliott | July 10, 1956 |
| 2,762,823 | Speier | Sept. 11, 1956 |

UNITED STATES PATENT OFFICE
CERTIFICATE OF CORRECTION

Patent No. 2,907,782                         October 6, 1959

Ronald M. Pike

It is hereby certified that error appears in the printed specification of the above numbered patent requiring correction and that the said Letters Patent should read as corrected below.

Column 1, lines 47 to 49, for the formula $$N_2N(CH_2)_a \overset{R'}{\underset{|}{Si}} X_{(3-b)} \quad \text{read} \quad H_2N(CH_2)_a \overset{R'}{\underset{|}{Si}} X_{(3-b)}.$$

Signed and sealed this 28th day of June 1960.

(SEAL)
Attest:

KARL H. AXLINE                                       ROBERT C. WATSON
Attesting Officer                                    Commissioner of Patents